United States Patent [19]

Orain

[11] 4,205,539
[45] Jun. 3, 1980

[54] AXIALLY-RETAINED TRIPOD HOMOKINETIC JOINT

[75] Inventor: Michel Orain, Conflans Ste Honorine, France

[73] Assignee: Glaenzer Spicer, Poissy, France

[21] Appl. No.: 923,726

[22] Filed: Jul. 11, 1978

[30] Foreign Application Priority Data

Jul. 28, 1977 [FR] France .................................. 77 23274

[51] Int. Cl.² .............................................. F16D 3/30
[52] U.S. Cl. ............................................ 64/21; 64/8
[58] Field of Search ................................ 64/21, 7, 8

[56] References Cited

U.S. PATENT DOCUMENTS

| | | | |
|---|---|---|---|
| 3,818,721 | 6/1974 | Wahlmark | 64/21 |
| 3,877,251 | 4/1975 | Wahlmark | 64/21 |
| 3,930,378 | 1/1976 | Schmidt | 64/21 |

Primary Examiner—Charles J. Myhre
Assistant Examiner—Magdalen Moy
Attorney, Agent, or Firm—Wenderoth, Lind & Ponack

[57] ABSTRACT

The two parts of the joint are axially retained by providing at least one intermediate element between the tripod element and the bell element of the joint. The intermediate element is connected to the bell element by a ball joint and allows a sliding of the tripod element in a direction perpendicular to the axis of the shaft rigid with the tripod element. This results in a longer life and an improved performance of the tripod joint.

11 Claims, 11 Drawing Figures

AXIALLY-RETAINED TRIPOD HOMOKINETIC JOINT

The present invention relates to axially-retained homokinetic joints of the tripod type.

These joints comprise two main parts, namely a tripod element and a bell element, each part being rigid with one of the shafts or elements to be connected. The tripod element comprises three spindles or trunnions on which are rotatably and slidably mounted three rollers which roll between three pairs of tracks having a part-circular section and formed in the bell element, the axes of the tracks being parallel to the axis of the shaft rigid with the bell. When it is desired to prevent freedom of relative axial displacement of the two shafts, a suitable device must be provided which allows the joint to retain its strength and angular movement. Thus, in French Pat. No. 1,272,530 filed on 4th, July 1960, the arrangement adopted consists in giving the centre part of the tripod element a part-spherical shape in contact with two opposed roughly radial surfaces provided on the bell element. However, in such an arrangement, the axial forces are applied practically at a point and wear is relatively high.

An object of the present invention is to provide a tripod joint comprising an axial retaining device which has the advantage of long life and is capable of retaining the precision of the axial connection throughout the life of the joint.

This is achieved in a joint of the tripod type which comprises a first part in the form of a tripod element rigid with one of the shafts to be connected and a second part in the form of a bell element which is rigid with the other of the two shafts, the tripod element comprising three trunnions on which are rotatably and slidably mounted rollers received in three raceways having a part-circular sectional shape formed in the bell element, the axes of the raceways being parallel to the axis of the shaft rigid with the bell element, axial retaining means for retaining the two parts of the joint relative to each other, and at least one intermediate element connected to the bell element by a ball joint and connected to the tripod element by a sliding connection which slides in a direction roughly perpendicular to the axis of the shaft rigid with the tripod element.

According to other features:

the concave part of the ball joint is completely formed in the bell element;

the concave part of the ball joint is formed partly in the bell element and partly in an element which is detachably secured to the bell element;

the sliding connection is formed by two planar faces formed on the tripod element and cooperative with two planar surfaces formed on the intermediate element or elements;

two separate intermediate elements are provided disposed on each side of the tripod element and connected by a rod which is in one piece with or rigid with one of the intermediate elements and extends in a passageway formed in the centre part of the tripod element;

a single intermediate element is provided comprising two parts which are roughly symmetrical relative to the plane of symmetry of the tripod element and connected by at least one bridge portion passing round the hub of the tripod element;

the intermediate element is constructed in three segments capable of occupying, on one hand, a withdrawn position in which they can be inserted in the bell element, and, on the other hand, an operative position in which they are locked inside the bell element and constitute the convex part of the ball joint.

The invention will now be described in more detail with reference to the drawings which are given solely by way of example and in which:

FIG. 1 shows a tripod joint which is capable of wide angular deviation between the two parts of the joint and in which the shafts connected thereby are retained axially in accordance with the present invention.

Figure 1:
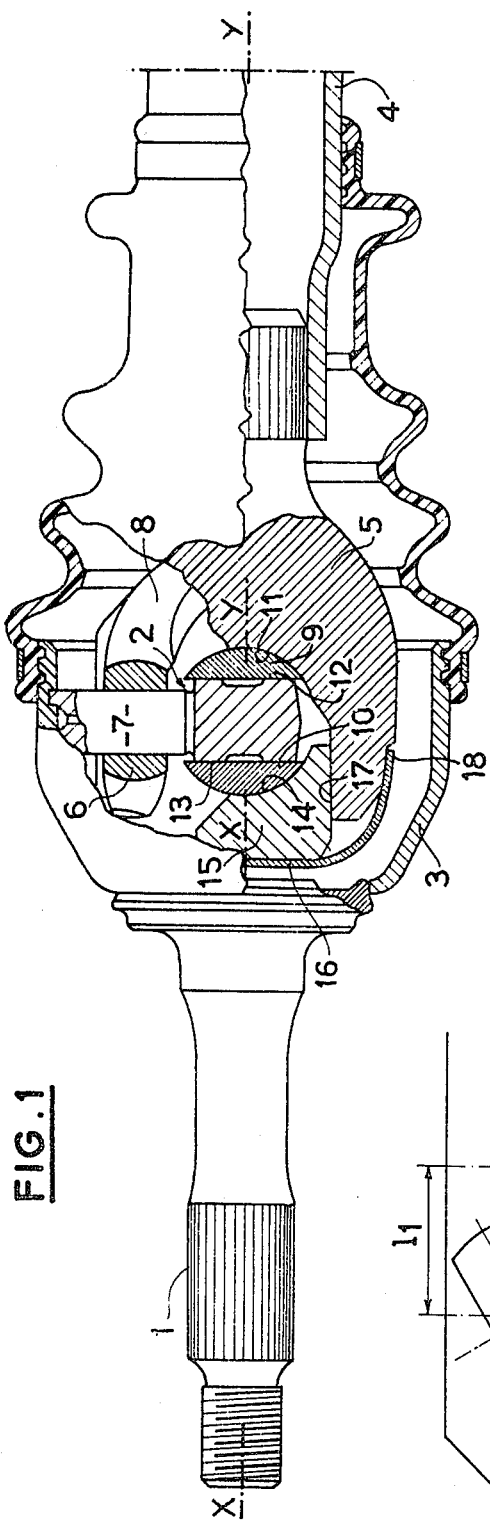
FIG. 1 is an elevational view, with a part cut away and partly in section, of a first embodiment of a joint according to the invention.

A stub-axle having an axis X—X, which drives a wheel (not shown) of a front-drive vehicle, is rigid with a tripod element 2 through a bowl-shaped element 3. A tubular shaft 4 having an axis Y—Y fixed to the bell element 5 transmits the driving torque to the tripod element 2, the bowl-shaped element 3 and the stub axle 1, through three rollers 6 which are rotatable and slidable on trunnions 7 of the tripod element 2 and roll along raceways 8 formed in the bell element. These raceways are formed by pairs of grooves having a part-circular section the axes of which are parallel to the axis of the shaft 4.

The axial retaining device according to the invention comprises two planar-convex elements 9 and 10. The element 9 is interposed between a concave part-spherical inner end 11 of the bell element and a planar surface 12 of the tripod element, and the element 10 is interposed between another planar face 13 of the tripod element and a part-spherical concave seat 14 formed in a thrust element 15. The latter is axially trapped between an elastically yieldable fastener 16 having three branches and the element 9 and radially centered in a bore 17 of the bell element. The fastener 16 has three branches 18 clipped into three cavities 19 formed in the outer surface of the bell element. The two convex faces of the element 9, 10 and the concave bearing surfaces 11 and 14 constitute a ball joint the centre of which is the centre of the tripod joint. When the stub-axle is placed at an angle, the two planar-convex elements 9 and 10 are inclined with the tripod element by the swivelling effect between their part-spherical surfaces and the complementary part-spherical seats 11 and 14 formed respectively in the inner end of the bell element and on the thrust element 15. Simultaneously, a sliding of the planar surfaces 12 and 13 permits a relative radial adaptation between the tripod element 2 and the bell element 5.

This device has a wear resistance which is substantially increased relative to the devices of the art and consequently the main object of the invention is attained. Moreover, the part-spherical shape of the inner end 11 of the bell element largely contributes to the strengthening of this element which is subjected to high bending stresses.

Figure 4:
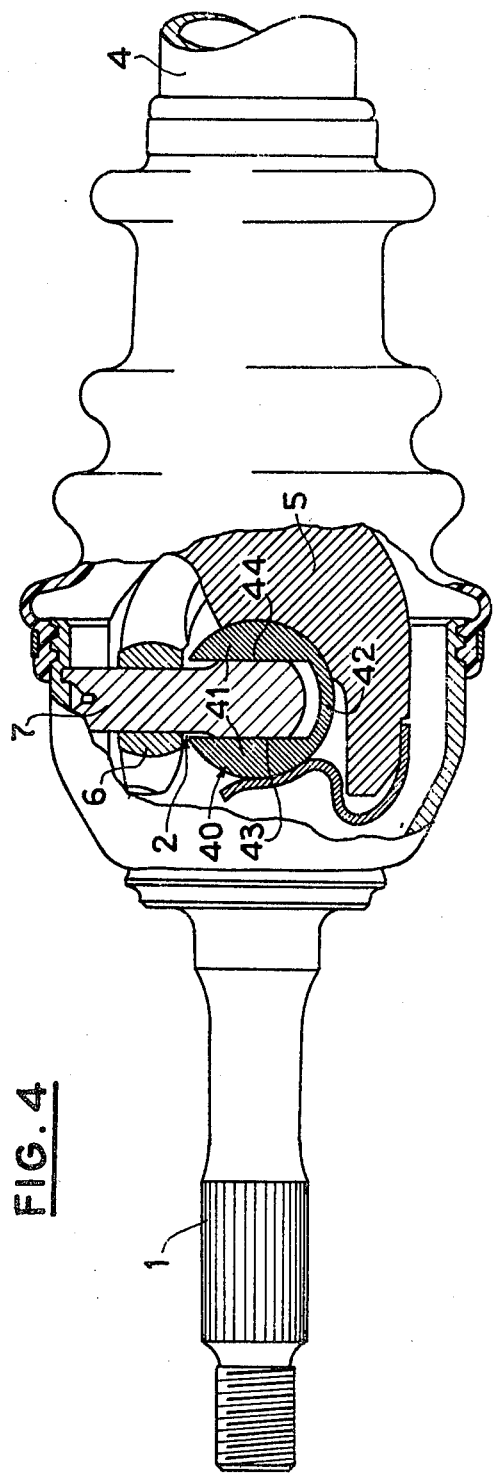
FIG. 4 is an elevational view, partly in section, of a modification.

Another notable advantage provided by this device is to reduce the distance travelled through by the roller on the raceways for a given angular deviation δ, which permits shortening by a length λ the recesses defined between the raceways and consequently either reducing the bending moments, all other factors being equal, or increasing the transmissible torque for a given bending moment. The value of the shortening λ is given by the following formula (FIG. 4)

$$\lambda = r/s \ (1/\cos\delta - 1) \sin\delta \qquad (1)$$

wherein r represents the distance between the axis Z—Z of a raceway and the axis Y—Y of the bell element;

δ is the angular deviation of the two parts of the joint in operation.

On the other hand, if the same raceway lengths are retained, the device according to the invention enables the angular deviation to be increased.

Indeed, the travel of the roller is:
in respect of a joint of the prior art:

$$l_1 = r \tan\delta_1 + (r/2)(1/\cos\delta_1 - 1)\sin\delta_1 \qquad (2)$$

and, in respect, of a joint according to the invention, $$l_2 = r \tan\delta_2 \qquad (3)$$

By equating $l_1$ and $l_2$ there is obtained a relation between the allowable maximum deviation angles for the two structures:

$$\tan\delta_2 = (3/2 \tan\delta_1) - (\sin\delta_1/2) \qquad (4)$$

Figure 3:
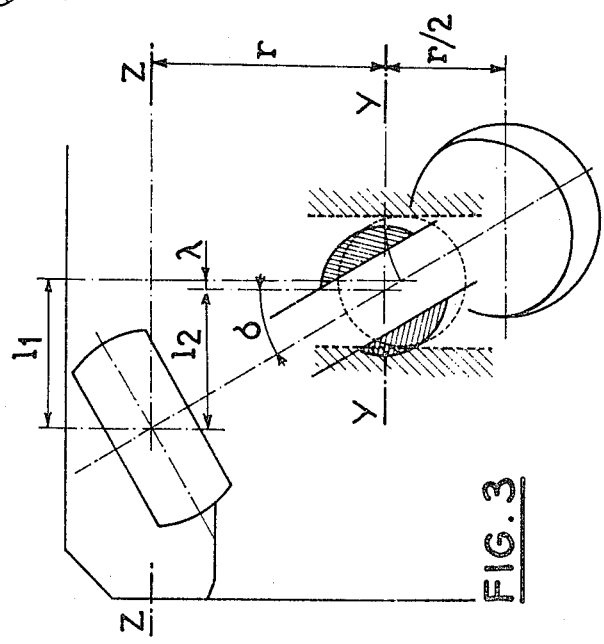
FIG. 3 is a diagram illustrating one of the advantages obtained.

In FIG. 3, the full lines represent the device according to the invention in which the ball joint remains centered for an angular deviation of the tripod joint, whereas a sliding occurs between the tripod element and the ball. The dotted lines represent a conventional arrangement in which the ball is placed between two roughly planar surfaces and becomes out of centre for an angular deviation, which gives the difference λ between $l_1$ and $l_2$. This value of λ increases of course with the angular deviation of the tripod joint in operation.

For example, to a maximum angular deviation of 45° in respect of a joint of the prior art, there corresponds, according to the structure of the present invention, an angle of 49° which represents a considerable gain of 4°.

In FIGS. 4 to 11, the elements corresponding to those of FIG. 1 which have not been markedly modified are designated by the same reference numbers.

In the embodiment shown in FIG. 4, the tripod element 2 and the bell element 5 are axially retained by means of an intermediate element 40 having a generally part-spherical shape and so constructed as to constitute two portions 41 equivalent to the elements 9 and 10 of FIG. 1 interconnected by at least one bridge portion 42 which extends between two adjacent branches or trunnions 7 of the tripod element. As before, this element 40 slides without clearance on two planar faces 43 and 44 of the tripod element and provides a ball joint as it is received between a concave part-spherical bearing surface 46 defined by a fastener 47 clipped by three branches 48 in three cavities 49 of the bell element. Assembly is achieved by sliding the element 40 on the hub of the tripod element before the latter is placed in position and secured in the bowl-shaped element 3.

Figure 5:
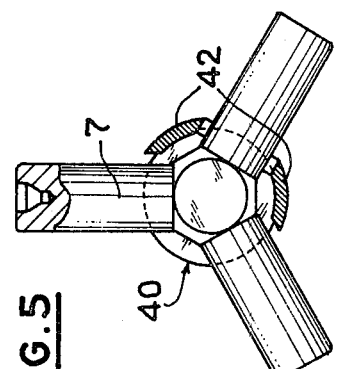
FIG. 5 is a sectional view taken on line V—V of FIG. 4.

FIG. 5 shows two bridge portions 42 which are interposed between the branches or trunnions 7 of the tripod element.

Figure 6:
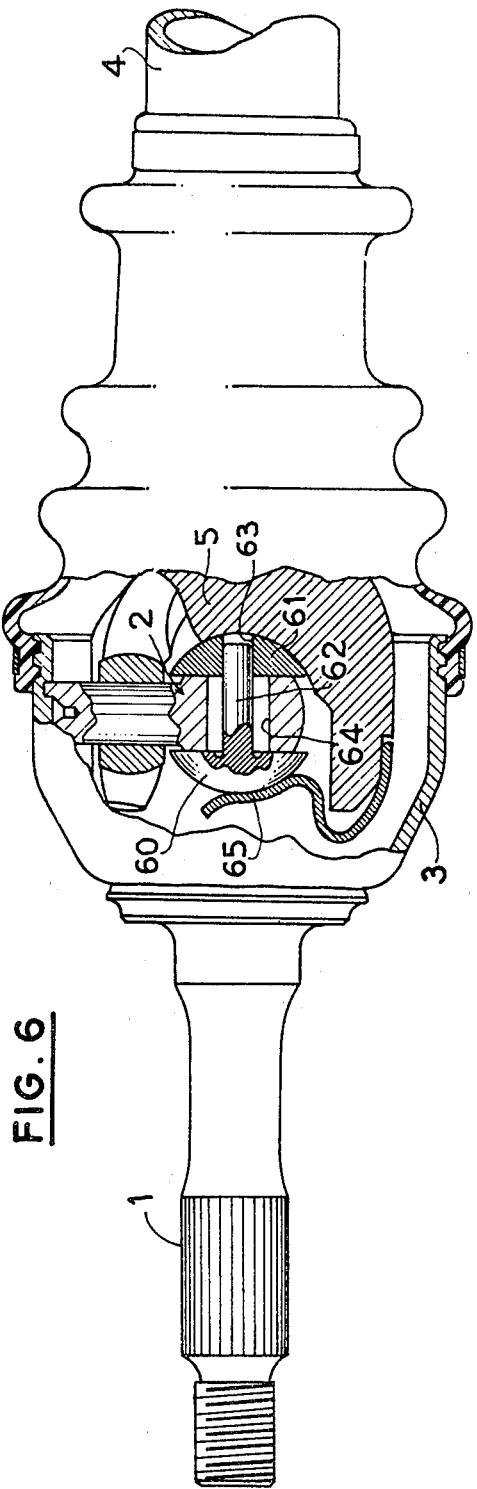
FIG. 6 is an elevational view, partly in section, of another modification.
Figure 8:
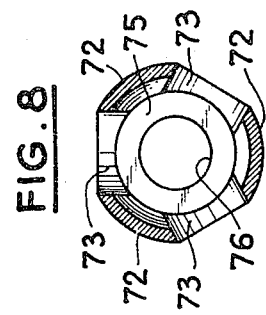
FIG. 8 is a cross-sectional view of a part of the joint shown in FIG. 7.

The embodiment shown in FIG. 6 is also of the same type as that shown in FIG. 1 since it comprises two elements 60, 61 defining the convex part-spherical bearing surfaces of the ball joint and the planar faces of the sliding connection with the tripod element 2. These two elements are connected by a rod 62 which is integral with or secured to one of the elements and fitted in a cavity 63 in the other element. The rod 62 extends with sufficient radial clearance through a bore 64 formed in the hub of the tripod element. As before, the assembly is axially maintained by a fastener 65.

Figure 7:
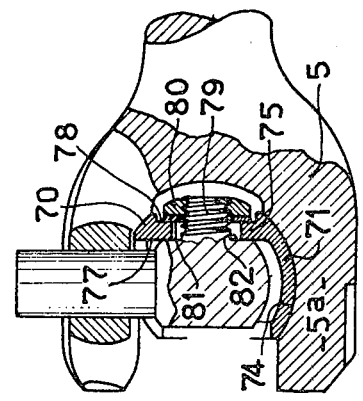
FIG. 7 is a partial sectional view of a joint according to another modification.

FIG. 7 shows an embodiment in which the ball connection to the bell element 5 is obtained by means of a hollow element 70 (FIG. 8) comprising a part-spherical wall 71 divided into three segments 72 separated by three notches 73 through which extend the three branches 7 of the tripod element. This part-spherical wall is received in a concave part-spherical cavity 74 formed in the branches $5^a$ of the bell element. The element 70 further comprises an end wall 75 provided with a bore 76 and defining two planar parallel faces 77, 78. Extending in the bore 76 is a screwthreaded stud 79 which is in one piece with or rigid with the hub of the tripod element and carries a nut 80 and a washer 81 or any known like means. The hub of the tripod element has a corresponding planar face 82 and the sliding connection between the tripod element and the intermediate element is provided by the clamping of the wall 75 of the hollow ball between the lateral surface 82 of the tripod element and the washer 81 by the nut 80.

After the adjustment of the bearing force by rotation of the nut, the latter is carefully held fast to the rod 79. Access may be had to this nut for assembly and disassembly by swinging the bell element 5 until it reaches the maximum angular deviation of the two joint parts.

Figure 10:
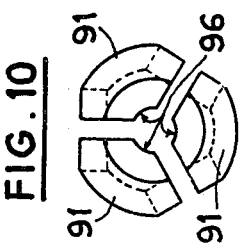
FIG. 10 is an end elevational view of the arrangement in three segments of an intermediate element of the joint shown in FIG. 9.
Figure 9:
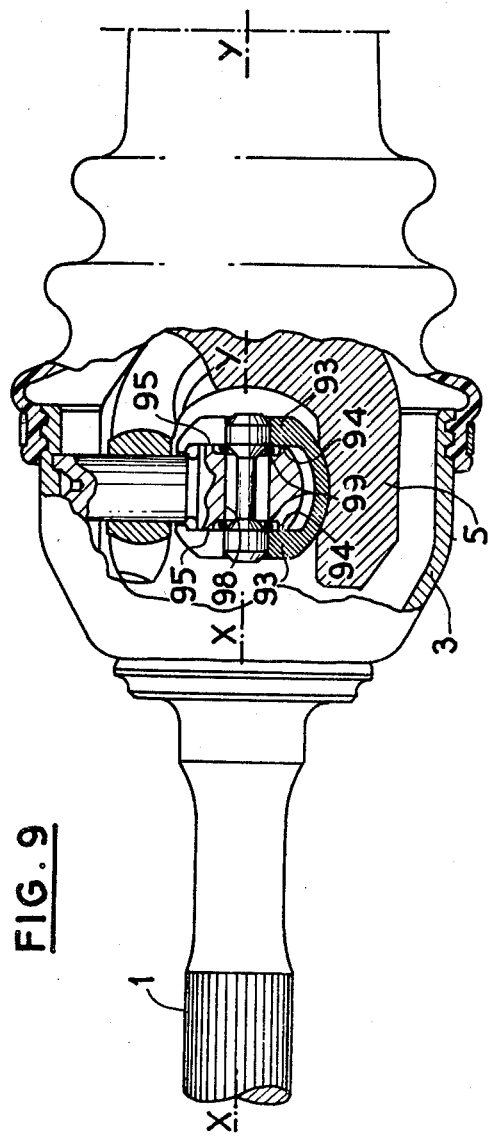
FIG. 9 is an elevational view, partly in section, of another modification.
Figure 11:
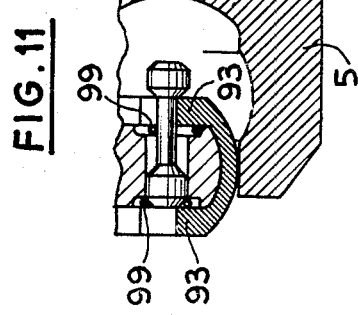
FIG. 11 is a partial sectional view of the joint shown in FIG. 9 in its assembled state.

FIGS. 9 to 11 show another embodiment of the device according to the invention. The intermediate element 90 is formed by three segments 91 (FIG. 10) each of which subtends an angle of 120° at the centre of the element 90. Each of these segments comprises a part-spherical wall 92 forming part of the ball and two end walls 93 defining parallel planar surfaces 94 adapted to cooperate with the lateral surfaces 95 of the tripod element. The two end walls 92 are defined internally by part-cylindrical surfaces 96 the generatrices of which are parallel to the axis X—X of the tripod element. The arrangement is completed by a dumb-bell shaped pin 97 the function of which will be apparent from the ensuing description and which extends through a bore 98 of the tripod with clearance.

When the three segments 91 are placed around the hub of the tripod, the pin 97 occupying the position shown in FIG. 11, they can be moved toward each other to a withdrawn position thereof so as to permit the insertion of the bell element 5 within the bowl-shaped element 3, the outside diameter of the three segments being slightly smaller than the diameter of the bore of the bell element.

When the part-spherical segments are in facing relation to the concave cavity in the bell element, the joint is placed in its position of maximum angular deviation of its two parts so as to render the end of the pin 97 accessible. A thrust exerted on this pin makes its assume its final position shown in FIG. 9 in which it is retained by two elastically-yieldable rings 99. The three segments 91 are then radially spread apart and axially lock the tripod element with respect to the ball element. Disassembly is achieved just as easily by thrusting the pin 97 to its end position in order to radially release the three segments.

In these various embodiments, the invention has the same important advantages over the prior art. Thus, the joint is very strong and has a longer life owing to the large size of the surfaces which are in sliding contact and their good lubrication since the whole of the joint bathes in lubricant.

The strength of the bell element is furthermore increased since it is possible to shorten the branches defining the raceways and increase the internal fillet radius of the connection of these branches to the centre part of the bell element. Alternatively, for a given strength, the maximum angular deviation of the two joint parts may be increased. The construction, assembly and disassembly of the component parts of the joint remain moreover very simple.

Figure 2:
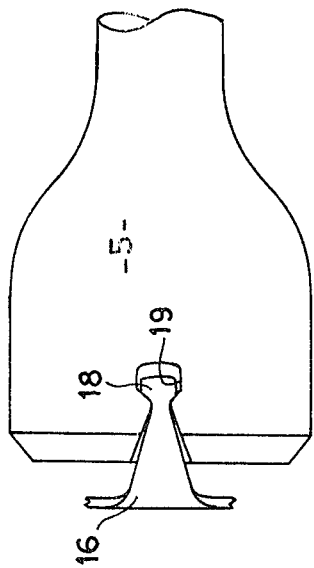
FIG. 2 is a detail elevational view.

The embodiments shown in FIGS. 4 to 11 are substantially more advantageous than that shown in FIGS. 1 to 3. Indeed, in the latter case, for a large angular deviation of the two shafts connected by the tripod joint, the stability of the separate parts 9, 10 in the shape of a planar-convex meniscus, is less satisfactory than that of the assembled elements or the elements in one piece which perform the same function in the other embodiments of the joint. After a period of utilization of the joint, play may be produced which might result in a wedging or escape of the meniscuses owing to an insufficient enclosing angle in the region of the meniscus-retaining arcs provided on the bell element, or on the part connected to the latter, which defines one of the part-spherical surfaces of the ball joint. As opposed to this, with a single intermediate part or elements rendered rigid with each other, this risk is avoided, since the enclosing angle is equal to the sum of the elementary angles and reaches a value sufficient to prevent any wedging and of course any escape.

Although the various figures show the bell element rigid with the driving shaft of the joint and the tripod element rigid with the stub-axle, the reverse arrangement may of course be adopted. It is then possible to place a part-spherical cup on a ring of elastomer fixed to the stub-axle and connected through a ball joint to the bowl-shaped element which is rigid with the other shaft and carries the tripod element.

Having now described our invention what We claim as new and desire to secure by Letters Patent is:

1. A homokinetic joint for coupling two members rotatable about respective axes and comprising a first part which includes a tripod element rigid with a first of said two members and a second part including a bell element which is rigid with a second of said two members, the tripod element comprising three trunnions, three rollers respectively rotatable and slidably mounted on the trunnions, three raceways which have a part-circular sectional shape and are defined by the bell element and respectively receive the three rollers which are in rolling engagement with the raceways, and retaining means for axially retaining the two parts of the joint relative to each other and comprising, at least one intermediate element, a ball joint structure connecting the intermediate element to the bell element, and connecting means connecting the intermediate element to the tripod element and providing a connection which is slidable in a direction substantially perpendicular to the axis of the member rigid with the tripod element.

2. A joint as claimed in claim 1, wherein the ball joint has a part which is concave and is entirely formed in the bell element, in particular in an inner surface of branches of the bell element which define the three raceways.

3. A joint as claimed in claim 1, comprising a member detachably fixed to the bell element, the ball joint having a concave part which is formed partly in the inner end of the bell element and partly in said member detachably fixed to the bell element.

4. A joint as claimed in any one of the claims 1 to 3, wherein the connecting means comprises means defining two planar faces at least one of which faces is formed on the tripod element, and two planar surfaces provided on the intermediate element, said planar faces cooperating with two planar surfaces formed on the intermediate element.

5. A joint as claimed in any one of the claims 1 to 3, comprising two of said intermediate element which have a planar-convex shape, a stud which is rigid with one of the intermediate elements and a bore defined in a centre portion of the tripod element, the stud extending with radial clearance through said bore.

6. A joint as claimed in claim 1 or 2, comprising a hub portion on the tripod element, a single said intermediate element which has two planar-convex parts which are substantially symmetrical with respect to a plane of symmetry of the tripod element and at least one bridge element which extends around the hub portion of the tripod element and interconnects said two planar-convex parts.

7. A joint as claimed in claim 1, wherein the tripod has three branches and a lateral face, the intermediate element is hollow and comprises a part-spherical wall which is divided into three segments separated by three notches through which the three branches of the tripod element extend, and an end wall defining a bore and two parallel planar faces, the tripod element has a screwthreaded stud which extends through the bore of the end wall of the intermediate element and a thrust member and a nut are mounted on the stud, and said connecting means comprise the end wall of the intermediate element which is in clamped relation with and between the lateral face of the tripod element and the thrust member.

8. A joint as claimed in claim 1, wherein said intermediate element is in three segments capable of occupying a withdrawn position in which they can be inserted in the bell element and an operative position in which they are locked inside the bell element and constitute a ball part of the ball joint.

9. A joint as claimed in claim 8, wherein each segment carries a part-spherical wall and two radial end walls for slidingly guiding the intermediate element relative to the tripod element.

10. A joint as claimed in claim 8 or 9, comprising a bore in the tripod element, a dumb-bell shaped pin which has enlarged end portions and extends with clearance through the bore in the tripod element, the enlarged end portions of the pin maintaining the segments of the intermediate element in the operative position thereof.

11. A joint as claimed in claim 10, comprising at least one elastically yieldable ring for holding the dumb-bell shaped pin in position relative to the tripod element.

* * * * *